United States Patent Office 3,359,302
Patented Dec. 19, 1967

3,359,302
BIS(p-PHENYLPHENYL) DIPHENATE
Harold D. Medley, Weston, Conn., and Arthur W. Schnizer, Corpus Christi, Tex., assignor to Celanese Corporation, a corporation of Delaware
No Drawing. Filed Mar. 5, 1962, Ser. No. 177,191
1 Claim. (Cl. 260—475)

This invention relates to novel esters. It more particularly relates to novel esters, the acidic moiety of which is an aryl carboxylic acid.

Esters according to this invention have utility as lubricants, particularly for use at high temperatures under non-reducing conditions such as are found for example in modern turbine engines.

This invention includes the reaction products of benzoic acid, isophthalic acid, terephthalic acid, trimesic acid, diphenic acid and substitution products thereof with phenols, cresols, xylenols, neoalcohols, phenylcarbinols and substitution products thereof.

As used herein, the prefix neo is defined as meaning α-dimethyl substituted compounds.

According to one aspect of this invention, there are provided diesters of diphenic acid corresponding to the formula:

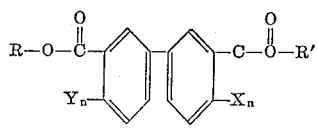

where: X and Y are hydrogen or nonfunctional substituents; R and R' are aryl, alkylaryl, haloalkyl, haloalkylaryl or alkyl radicals having at least about 5 carbon atoms, and $n$ is a positive integer.

According to another aspect of this invention, there are provided diesters of isophthalic acid or terephthalic acid corresponding to the formula:

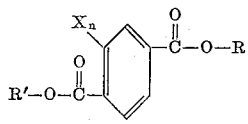

where:

X is hydrogen or a non-functional substituent; R and R' are aryl, alkylaryl, haloaryl, haloalkylaryl or alkyl radicals having at least about 5 carbon atoms, and $n$ is a positive integer.

According to still another aspect of this invention, there are provided triesters of trimesic acid corresponding to the formula:

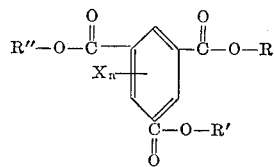

where:

X is a hydrogen or a nonfunctional substituent; R, R' and R'' are aryl, alkylaryl, haloalkyl, haloalkylaryl of alkyl radicals having at least 5 carbon atoms, and $n$ is a positive integer.

According to a still further aspect of this invention there are provided benzoic acid esters corresponding to the formula:

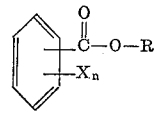

where:

X is hydrogen or a nonfunctional substituent; R is an alkylaryl radical having about 10 to 20 carbon atoms and $n$ is a positive integer.

It is within the scope of this invention to provide mixed esters. That is, dicarboxylic acids or tricarboxylic acids can be esterified with a different hydroxyl moiety for one or more of the carboxyl groups present in the acid. Thus, diphenic acid can be esterified with phenol and p-phenylphenol to provide a mixed ester. Similarly, trimesic acid can be esterified with three different hydroxyl moieties e.g. phenol, p-phenylphenol and xylenol to provide a mixed ester. Alternately, diesters or triesters can be formed such as diphenyl diphenate or triphenyl trimesate.

More specifically, the hydroxyl moiety of an ester according to this invention is exemplified by phenol, cresol (any isomer), xylenol (any isomer), chlorophenol (any isomer), trifluoromethylphenol (any isomer), phenylphenol (any isomer), neopentyl alcohol, octylphenol (any isomer) and phenylcarbinol.

The nonfunctional substituents referred to herein include hydrocarbon radicals which are not reactive with carboxyl or hydroxyl groups. These include methyl, ethyl, tertiary butyl and phenyl groups for example.

Esters in accordance with this invention can be made by direct esterification of a suitable acid with an appropriate hydroxy compound as set forth above. It is also practical to react acid halide, such as diphenoyl chloride for example, with an appropriate hydroxy compound. Also within the scope of this invention, acid anhydrides can be reacted with appropriate hydroxy compounds to produce esters. Where mixed esters are desired, either the acid, acid halide, or acid anhydride can be reacted with a mixture of hydroxy compounds or with each hydroxy compound in seriatim to provide a mixed ester.

Each of the above modes of preparing esters in accord with this invention is operable without a catalyst, heat usually being sufficient to promote the reaction. It is preferred, however, to catalyze the reaction since this improves the economics in terms of yield, efficiency and duration. Several catalysts are available to enhance the esterification reaction including metal halides such as aluminum chloride and magnesium chloride; as well as dialkyl amides such as dimethylformamide. Tertiary bases (amines) are also useful in this reaction to bind hydrogen chloride as it is formed thereby driving the reaction toward the ester side.

It is proper to carry out this reaction between room temperature and about 200° C. and preferably between 25 and 100° C. The reaction temperature is of course dependent upon the specific reaction in progress as is the reaction time. The reaction time can vary from about 1 to several hours preferably under reflux conditions. It is also preferred that the reaction take place in solution, although this is not necessary. Suitable inert solvents include toluene, benzene, carbon tetrachloride, and aliphatic hydrocarbons such as naphtha and petroleum ether. Where the esterification is to be a catalyzed reaction in solution, the acidic moiety is suitably dissolved in an inert solvent and the catalyst added thereto. In order to control the exothermicity of the reaction, the hydroxy compound is added to the solution very slowly while the solution temperature is maintained at a predetermined level. If it is practical, the hydroxyl compound can even be added dropwise in order to avoid violent exothermic conditions. The mixture of hydroxy compound, acid moiety and catalyst is refluxed for a suitable length of time (until hydrogen chloride gas ceases to be liberated, where the acid moiety is an acid chloride, or until water ceases to be evolved, where direct esterification is utilized), and the reaction products are then washed whereupon the solvent is flashed off and the product recovered. If necessary or desired, the product can be decolorized, as with charcoal for example, and filtered after it is recovered to purify it.

The following specific examples of diphenic acid esters are given to illustrate but in no way limit this invention.

*Example I*

Diphenyl diphenate was prepared by dissolving 371.7 parts by weight (1.33 moles) of diphenoyl chloride in 440 parts by weight of benzene and adding 19 parts by weight of dimethylformamide catalyst thereto. Phenol was slowly added to this mixture, 276 parts by weight (2.93 moles) in 2 hours. The reactants were refluxed at about 100° C. for 120 minutes until the reaction was complete, as evidenced by a cessation in the evolution of hydrogen chloride gas, whereupon 49 parts by weight of dry pyridine was added to the reaction product and the resultant mixture washed with an equal volume of water which was acidified with concentrated hydrochloric acid until strongly acid to remove the pyridine, and with 2% aqueous sodium hydroxide to remove any excess phenol. The product was then dehydrated, decolorized with charcoal, and vacuum-filtered. The yield after recrystallizing the product from benzene was 86% (294 parts by weight) based upon the amount of diphenoyl chloride charged.

*Example II*

Dixylenyl diphenate was made by dissolving 1200 parts by weight (4.3 moles) of diphenoyl chloride in 600 parts by weight of toluene and adding 0.9 part by weight of dimethylformamide catalyst thereto. The solution was heated to 70° C. and 1100 parts by weight (9.2 moles) of xylenol (mixed isomers) was slowly added thereto while maintaining the solution temperature between 70 and 80° C. The reactants were refluxed for 30 minutes until the reaction was complete, as evidenced by this cessation of hydrogen chloride gas evolution; cooled to 40° C., and 69 parts by weight of dry pyridine was added thereto. The mixture was permitted to stand overnight whereupon the reaction product was washed with an equal volume of water, acidified with concentrated hydrochloric acid to a pH of 1, 2% aqueous sodium hydroxide and then water; vacuum-distilled at 240–280° C. and 0.3 mm. Hg absolute to remove solvent; decolorized with charcoal; and filtered. The yield was 85% (1640 parts by weight) based upon the amount of diphenoyl chloride charged.

*Example III*

Bis(o-chlorophenyl) diphenate was prepared by dissolving 278 parts by weight (1.0 mole) of diphenoyl chloride in 500 parts by weight of toluene and 160 parts by weight of pyridine. This solution was cooled with ice water while 263 parts by weight (2.02 moles) of o-chlorophenol was added dropwise to the solution. The reaction mixture was stirred for one hour at room temperature and then heated to 105° C. for 3 hours. The resultant product was washed with strong hydrochloric acid at a pH less than 1, 2% aqueous sodium hydroxide and then water; vacuum-stripped to remove the solvent; and recrystallized from hot benzene to give an 85% yield (395 parts by weight) based upon the amount of diphenoylchloride charged.

*Example IV*

Bis(m-trifluoromethylphenyl) diphenate was prepared by dissolving 270 parts by weight (1 mole) of diphenoyl chloride in 390 parts by weight of toluene and adding 5 parts by weight of magnesium chloride thereto. m-Trifluoromethyl phenol was added slowly, 340 parts by weight (2.1 moles) in 1 hour, added to this solution while maintaining the temperature as 70 to 80° C. The reactants were refluxed at 100° C. for 2 hours; cooled to about 50° C. and washed with concentrated hydrochloric acid at a pH of about 1, 2% aqueous sodium hydroxide and then water. The washed reaction products were vacuum-stripped to remove the solvent therefrom, decolorized with carbon, and vacuum-filtered to evolve 394 parts by weight of product. The yield was 74% based upon the amount of diphenoyl chloride charged.

*Example V*

Bis(p-phenylphenyl) diphenate was prepared by dissolving 280 parts by weight (1.65 moles) of p-phenylphenol in 454 parts by weight of toluene, adding 45 parts by weight of dimethylformamide catalyst thereto and refluxing the solution for 1 hour at about 120° C. Two hundred ten parts by weight (0.75 mole) of diphenoyl chloride was dissolved in an equal weight of toluene and added to the p-phenylphenol solution at about 85° C. The reaction mixture was refluxed for three hours at 110° C., cooled to room temperature, 49 parts by weight of pyridine added thereto, and the resulting mixture was refluxed for an additional 2 hours at 120° C. The hot reaction products were washed with 2% aqueous sodium hydroxide, concentrated hydrochloric acid at a pH of about 1 and water; and the ester product was recrystallized from boiling toluene twice to give 370 parts by weight of product. The yield was 89.2% based upon the amount of diphenoyl chloride charged.

*Example VI*

Phenyl p-phenylphenyl diphenate was prepared by dissolving 140 parts by weight (0.83 mole) of p-phenylphenol, 77 parts by weight (0.88 mole) of redistilled phenol and 49 parts by weight of dimethylformamide in 454 parts by weight of toluene; refluxing for 1 hour at 120° C.; and slowly adding 210 parts by weight 0.75 mole) of diphenoyl chloride (dissolved in about an equal weight of toluene) to the above solution at 85° C. The reaction mixture was refluxed for 3 hours at 110° C.; cooled to room temperature; 49 parts by weight of pyridine was added thereto; and the mixture refluxed for an additional 2 hours. The reaction products were washed with 2% aqueous sodium hydroxide, concentrated hydrochloric acid and water; vacuum-stripped; decolorized with carbon; and vacuum-filtered. The yield was 76% based upon the amount of diphenoyl chloride charged.

*Example VII*

Phenyl o-phenylphenyl diphenate was prepared by dissolving 140 parts by weight (0.83 mole) of o-phenylphenol, 77 parts by weight (0.83 mole) of redistilled phenol, and 49 parts by weight of dimethylformamide catalyst in 454 parts by weight of toluene; refluxing the solution for 1 hour at 120° C.; and slowly adding 210 parts by weight (0.75 mole) of diphenoyl chloride (dissolved in about an equal weight of toluene) thereto, while maintaining the reactants at 85° C. The reaction mixture was refluxed for 3 hours at 110° C.; cooled to room temperature; 49 parts by weight of pyridine was added; and the mixture refluxed for 2 additional hours. The reaction products were washed with 2% aqueous sodium hydroxide, concentrated hydrochloric acid, and water; vacuum-stripped; decolorized with charcoal; and vacuum-filtered. The yield was 81% based upon the amount of diphenoyl chloride charged.

*Example VIII*

Dineopentyl diphenate was prepared by dissolving 112.5 parts by weight (1.28 moles) of neopentyl alcohol and 101 parts by weight of dry pyridine in 132 parts by weight of benzene; and slowly adding this solution to a cooled solution of 168 parts by weight (0.58 mole) of diphenyl chloride in 220 parts by weight of benzene. The reaction mixture was refluxed for 2 hours at 100° C.; cooled to room temperature; and washed at about 50 to 60° C. with water and 2% aqueous sodium hydroxide to neutrality. The reaction product was stripped free of volatiles and then flashed, at 228 to 240° C. pot temperature and 225 to 240° C. vapor temperature at 4 mm. Hg absolute to obtain 201 parts by weight of product. The yield was 90.6% based upon the amount of diphenyl chloride charged.

*Example IX*

Phenyl, octylphenyl diphenate was prepared by dissolving 278 parts by weight (1 mole) of diphenoyl chloride and 19 parts by weight dimethylformamide in 347 parts by weight of toluene; and slowly adding a solution of 90 parts by weight (1 mole) of phenol and 203 parts by weight (1 mole) of octylphenol in 43.3 parts by weight of toluene at 50 to 70° C. over a period of 2 hours. The reaction mixture was cooled to room temperature; 49 parts by weight of dry pyridine was added; and the mixture was refluxed at 70° C. for 90 minutes. The reaction products were washed with concentrated hydrochloric acid, 2% aqueous sodium hydroxide and water; vacuum-stripped to remove the solvent; decolorized with charcoal; and filtered to give 386 parts by weight of product. The yield was 77%.

Table I, below, is a listing of the physical properties of some representative diphenic esters synthesized according to this invention.

2 hours at 130° C.; cooled to 50° C.; and 80 parts by weight of pyridine was added thereto. The reaction product was washed with concentrated hydrochloric acid; stripped free of solvents; and then flash-distilled at 170–180° C. and 1 to 3 mm. Hg absolute. The crude ester product was decolorized in a heptane solution and then recrystallized to give 333 parts by weight of product. The yield was 83% based upon the amount of terephthaloyl chloride charged.

*Example XII*

Di-p-cresyl terephthalate was prepared by dissolving 304.5 parts by weight (1.5 moles) of terephthaloyl chloride and 1 part by weight of magnesium chloride catalyst in 217 parts by weight of xylene; slowly adding 356.4 parts by weight (3.3 moles) of p-cresol thereto at 70° C.; and refluxing at 120° C. for 2 hours. The reaction product was water-washed; stripped to remove water and solvent; and then crystallized from toluene to give 480 parts by weight of product. The yield was 94% based upon the amount of terephthaloyl chloride charged.

*Example XIII*

Dibenzyl terephthalate was prepared by dissolving 304.5 parts by weight (1.5 moles) of terepthaloyl chloride and 1 part by weight of anhydrous magnesium chloride in 217 parts by weight of xylene; slowly adding 375 parts by weight (3.47 moles) of benzyl alcohol thereto at 40° C.; and refluxing at 120° C. for 2 hours. The reaction product was water washed; stripped to remove water

TABLE I

| Ester | M.P. (° C.) | Pour Point (° F.) | Acid No. (MgKOH/gm.) | Wt. Percent OH | Viscosity at 450° F. (CS) |
|---|---|---|---|---|---|
| Diphenyl diphenate | 81–82.2 | | 0.1 | 0.2 | 1.6 |
| Bis(o-chlorophenyl) diphenate | 95.6–100.4 | | 0.1 | 0.3 | 2.1 |
| Bis(m-trifluoromethylphenyl)diphenate | | 59 | 0.2 | 0.1 | 1.3 |
| Bis(p-phenylphenyl)diphenate | 196–197.8 | | 0.1 | 0.1 | 4.9 |
| Phenyl p-phenylphenyl diphenate | | 127 | 0.2 | 0.3 | 2.5 |
| Phenyl o-phenylphenyl diphenate | | 129 | 0.2 | 0.1 | 2.5 |
| Dineopentyldiphenate | | 14 | 0.1 | 0.1 | 1.0 |
| Phenyl octylphenyldiphenate | | 88 | 0.3 | 0.7 | 2.3 |
| Dixylenyl diphenate | | 98 | N.T. | N.T. | 2.0 |

N.T.=not tested.

The following examples of terephthalic acid esters and isophthalic acid esters are given to illustrate but in no way limit this invention.

*Example X*

Diphenyl terephthalate was prepared by dissolving 328 parts by weight (3.48 moles) of phenol and 46 parts by weight of dimethylformamide in 454 parts by weight of toluene; azeotroping at about 120 to 130° C. and atmospheric pressure until dry; and slowly adding 321 parts by weight (1.58 moles) of terephthaloyl chloride, in solution in an equal weight of toluene, to the above solution at 85° C. The reaction mixture was refluxed at 110° C. for 3 hours; cooled to 50° C.; 49 parts by weight of pyridine was added thereto; and the mixture refluxed at 130° C. for an additional 2 hours. The reaction products were washed in 2% aqueous sodium hydroxide, concentrated hydrochloric acid and water; and the ester product was recrystallized from boiling xylene. The yield was 75% based upon the amount of terephthaloyl chloride charged.

*Example XI*

Dineopentyl terephthalate was prepared by azeotroping 264 parts by weight (3 moles) of neopentyl alcohol with 454 parts by weight of benzene at 100° C. until dry; adding 9 parts by weight dimethyl formamide thereto; and slowly adding a solution of 275 parts by weight (1.36 moles) terephthaloyl chloride in 217 parts by weight of toluene thereto. The reaction mixture was refluxed for and solvent; and then crystallized from toluene to give 464.8 parts by weight of product. The yield was 87.5% based upon the amount of terephthaloyl chloride charged.

*Example XIV*

Dineoheptyl terephthalate was prepared by dissolving 267.8 parts by weight (1.3 moles) of terephthaloyl chloride and 1 part by weight of anhydrous magnesium chloride in 454 parts by weight of benzene; slowly adding 337 parts by weight (2.6 moles) of neoheptanol thereto at 60° C.; and refluxing the reaction mixture for 2 hours at 100° C. The reaction product was stripped free of solvent; vacuum-flashed; washed with water and 2% aqueous sodium hydroxide; dehydrated; and filtered to give 473 parts by weight of ester product. The yield was 77% based upon the amount of terephthaloyl chloride charged.

*Example XV*

Dixylenyl terephthalate was prepared by dissolving 305 parts by weight (1.51 moles) terephthaloyl chloride, 403 parts by weight 3.21 moles) commercial xylenol and 261 parts by weight of pyridine in 454 parts by weight of benzene at room temperature. The reaction mixture was refluxed for 1 hour at 110° C.; washed with water; and then vacuum-stripped. The crude ester was washed with 2% aqueous sodium hydroxide; dehydrated; decolorized with charcoal; and filtered to give 482.7 parts by weight of product. The yield was 86% based upon the amount of terephthaloyl chloride charged.

Example XVI

Diphenyl isophthalate was prepared by dissolving 328 parts by weight (3.48 moles) of phenol and 45 parts by weight of dimethyl formamide catalyst in 454 parts by weight of benzene; and azeotroped at about 100° C. until dry. Isophthaloyl chloride was slowly added, 321 parts by weight (1.58 moles) in 2 hours, to the solution at 75° C. The reaction mixture was refluxed at 90° C. for 3 hours; cooled to room temperature; 49 parts by weight of pyridine was added; and the reaction mixture refluxed at 110° C. for an additional 3 hours. The reaction product was washed with 2% aqueous sodium hydroxide, concentrated hydrochloric acid and water. The ester product was recrystallized from ethyl alcohol-benzene and from hot benzene to give 350 parts by weight of product. The yield was 70% based upon the amount of isophthaloyl chloride charged.

Example XVII

Bis(o-chlorophenyl) isophthalate was prepared by dissolving 250 parts by weight (1.24 moles) of isophthaloyl chloride and 320 parts by weight (2.5 moles) of o-chlorophenol in 432 parts by weight of toluene; adding 200 parts by weight of pyridine dropwise to the solution while maintaining the temperature at 40° C. The reaction mixture was heated to 110° C. for 1 hour; cooled; and washed with 2% aqueous sodium hydroxide, concentrated hydrochloric acid and water. The ester product was stripped at about 100° C. to remove the solvent therefrom; and recrystallized from benzene to give 312 parts by weight of product. The yield was 57% based upon the amount of isophthaloyl chloride charged.

Example XVIII

Bis(o-phenylphenyl) isophthalate was prepared by dissolving 373 parts by weight (2.2 moles) of o-phenylphenol and 47 parts by weight of dimethylformamide catalyst in 454 parts by weight of toluene; refluxing the solution for 1 hour at 130° C.; and adding 203.3 parts by weight (1 mole) of isophthaloyl chloride in solution in about an equal weight of toluene, at 85° C. The reaction mixture was refluxed for 3 hours at 110° C.; cooled to room temperature; 49 parts by weight of pyridine was added; and the reaction mixture refluxed at 130° C. for 2 additional hours. The reaction product was washed with 2% aqueous sodium hydroxide, concentrated hydrochloric acid and water. The ester product was recrystallized from hot toluene. The yield was 94.5% based upon the amount of isophthaloyl chloride charged.

Example XIX

Dineoheptyl isophthalate was prepared by dissolving 322 parts by weight (2.77 moles) of neoheptyl alcohol, 2 parts by weight of magnesium chloride catalyst and 222 parts by weight (1.26 moles) of isophthaloyl chloride in 454 parts by weight of toluene; refluxing this solution at 130° C. for 2 minutes until hydrogen chloride ceased to be evolved; refluxing the reaction mixture at 120° C. for 2 hours; cooling the reaction mixture at room temperature; adding 47 parts by weight of pyridine; and refluxing for an additional hour. The reaction product was water-washed, decanted, stripped free of volatiles and flash-distilled at 218° C. pot temperature, 212° C. vapor temperature and 2 mm. Hg absolute to give 438 parts by weight of product. The yield was 95% based upon the amount of isophthaloyl chloride charged.

Example XX

Dixylenyl isophthalate was prepared by dissolving 330 parts by weight (1.63 moles) of isophthaloyl chloride and 437 parts by weight (3.68 moles) of commercial xylenol in 454 parts by weight of benzene; adding 283 parts by weight of pyridine thereto; refluxing the reaction mixture for 1 hour and water-washing the reaction product to remove pyridine. The product was stripped free of volatiles; washed with 2% aqueous sodium hydroxide; dehydrated; decolorized with charcoal; and filtered to give 502.8 parts by weight of product. The yield was 82.7% based upon the amount of isophthaloyl chloride charged.

Example XXI

Dodecyl xylenyl isophthalate was prepared by ester interchange with dixylenyl isophthalate made as per Example XX. Dodecylphenol, 262 parts by weight (1 mole), was azeotroped with 454 parts by weight of benzene until dry; mixed with 374 parts by weight (1 mole) of dixylenyl isophthalate and 1 part by weight of sodium metal; solvent was removed by flashing at 20 mm. Hg absolute; and 112.1 parts by weight of xylenol was stripped off at 150° C. to 160° C. and 20 mm. Hg absolute to 1 mm. Hg absolute. The mixture was cooled to room temperature; 13.52 parts by weight of dimethyl sulfate was added; heated to 150° C. for 1 hour; vacuum-stripped at 150° C. and 0.5 mm. Hg absolute; washed with 2% aqueous sodium hydroxide; dehydrated; and filtered to give 465 parts by weight of product. The yield was 90.4%.

Example XXII

Bis(m-phenoxyphenyl) isophthalate was prepared by dissolving 60 parts by weight (0.3 mole) of isophthaloyl chloride and 2.74 parts by weight of dimethylformamide catalyst in 100 parts by weight of toluene; heating to 80° C.; slowing adding 100 parts by weight (0.54 mole) of m-phenoxyphenol to the solution; cooling to 0° C.; and adding 60 parts by weight of pyridine. The reaction product was permitted to stand overnight; then washed with concentrated hydrochloric acid, 2% aqueous sodium hydroxide and water; vacuum-distilled to remove the solvent; decolorized with charcoal; and vacuum-filtered to give 100 parts by weight of product. The yield was 74% based upon the amount of m-phenoxyphenol charged.

Table II, below, is a listing of the physical properties of some representative isophthalic and terephthalic esters synthesized according to this invention.

TABLE II

| Ester | M.P. (° C.) | Pour Point (° C.) | Acid No. (MgKOH/gm.) | Wt. Percent OH | Viscosity at 450° F. (CS) |
|---|---|---|---|---|---|
| Diphenyl isophthalate | 138.4-139 | | 0.1 | 0.3 | 1.3 |
| Bis(o-chlorophenyl) isophthalate | 102 | | 0.1 | 0.4 | 1.7 |
| Bis(o-phenylphenyl) isophthalate | 121.4-122.5 | | 0.1 | 0.1 | 2.8 |
| Dineoheptyl isophthalate | | −24 | 0.1 | 0.1 | 0.93 |
| Dixylenyl isophthalate | | 28 | 0.1 | 0.3 | 1.6 |
| Xylenyl dodecylphenyl isophthalate | | 32 | 0.1 | 0.4 | 3.2 |
| Diphenyl terephthalate | 197.6-199.2 | | 0.2 | 0.1 | 1.2 |
| Dineopentyl terephthalate | 109.2-199.2 | | 0.2 | 0.1 | 1.2 |
| Di-p-cresyl terephthalate | 20.1 | | 0.5 | 0.1 | 1.5 |
| Dibenzyl terephthalate | 95.6 | | 1.0 | 0.2 | 1.4 |
| Dineoheptyl terephthalate | 34.4 | | 0.1 | 0.2 | 1.7 |
| Dixylenyl terephthalate | 65.2 | | 0.1 | 0.3 | 1.1 |

The following example of trimesic acid esters are given to illustrate but in no way limit this invention.

*Example XXIII*

Triphenyl trimesate was prepared by dissolving 341 parts by weight (3.63 moles) of phenol and 288 parts by weight of dry pyridine in 454 parts by weight of benzene; slowly adding 292 parts by weight of trimesoyl chloride, dissolved in an equal volume of benzene, to the solution; and refluxing the reaction mixture at 110° C. for 2 hours. The reaction product was diluted with twice its volume of xylene; washed with concentrated hydrochloric acid, 2% aqueous sodium hydroxide and water; and cooled to 10° C. The precipitated ester product was recrystallized from xylene; washed with n-pentane; and vacuum-dried overnight to give 423.6 parts by weight of product. The yield was 88% based upon the amount of trimesoyl chloride charged.

*Example XXIV*

Trixylenyl trimesate was prepared by dissolving 448 parts by weight (3.68 moles) of commercial xylenol and 290 parts by weight of pyridine in 440 parts by weight of benzene; slowly adding 295.2 parts by weight (1.11 moles) of trimesoyl chloride to the solution; heating the reaction mixture to 100° C. for 1 hour; cooling to 150° C.; diluting with twice its weight of benzene; and washed with concentrated hydrochloric acid, 2% aqueous sodium hydroxide and water. The ester product was vacuum-stripped; diluted with an equal weight of benzene; decolorized with charcoal; filtered; and again vacuum-stripped to give 447 parts by weight of product. The yield was 85.6% based upon the amount of trimesoyl chloride charged.

*Example XXV*

Trineopentyl trimesate was prepared by dissolving 282 parts by weight (3.21 moles) of dry neopentyl alcohol and 2 parts by weight of anhydrous magnesium chloride catalyst in 220 parts by weight of benzene; slowly adding 303 parts by weight (1.14 moles) of trimesoyl chloride at 50–60° C.; refluxing for 18 hours at 110° C.; cooling to room temperature; adding 9.8 parts by weight of pyridine; and washing with water, 2% aqueous sodium hydroxide and again with water. The ester product was stripped free of volatiles and vacuum-flashed at 246–252° C. and 6 mm. Hg absolute and then recrystallized from isopropanol. The product was then rewashed with 2% aqueous sodium hydroxide, stripped and filtered.

*Example XXVI*

Tribenzyl trimesate was prepared by dissolving 393 parts by weight (3.64 moles) of benzyl alcohol and 1 part by weight of anhydrous magnesium chloride in 340 parts by weight of n-heptane; slowly adding 292.2 parts by weight (1.1 moles) of trimesoyl chloride; and refluxing for 2 hours at 120° C. The reaction product was vacuum-stripped to remove volatiles and recrystallized from n-heptane.

*Example XXVII*

Trineoheptyl trimesate was prepared by dissolving 430 parts by weight (3.71 moles) of neoheptyl alcohol and 1 part by weight of anhydrous magnesium chloride in 440 parts by weight of benzene; slowly adding 298.4 parts by weight (1.12 moles) of trimesoyl chloride to the solution at 70° C.; and refluxing for 2 hours at 110° C. The reaction product was vacuum-stripped at 260° C. and 1 mm. Hg absolute to remove solvent and excess alcohol; washed with 2% aqueous sodium hydroxide and water; dehydrated, decolorized with charcoal; and filtered.

*Example XXVIII*

Tri-p-cresyl trimesate was prepared by dissolving 390 parts by weight (3.61 moles) of p-cresol and 285 parts by weight of dry pyridine in 440 parts by weight of benzene; slowly adding 290.4 parts by weight (1.04 moles) of trimesoyl chloride to the solution; and refluxing for 2 hours at 110° C. The reaction product was cooled to 50° C.; diluted with twice its weight of benzene; washed with concentrated hydrochloric acid, 2% aqueous sodium hydroxide and water; and vacuum-stripped to remove solvent and water to give 466.2 parts by weight of product. The yield was 89% based upon the amount of trimesoyl chloride charged.

Table III, below, is a listing of physical properties of certain trimesic acid esters according to this invention.

TABLE III

| Ester | M.P. (° C.) | Pour Point ° C. | Acid No. (MgKOH/gm.) | Percent OH | Viscosity at 450° F. (CS) |
|---|---|---|---|---|---|
| Triphenyl trimesate | 174.8–175.2 | | 0.2 | 0.6 | 3.0 |
| Trixylenyl trimesate | 90.2–94.3 | | 0.3 | 0.3 | 4.6 |
| Trineopentyl trimesate | 92.2–93.2 | | 0.2 | 0.2 | 1.3 |
| Tribenzyl trimesate | 93 | | 0.1 | 0.1 | 2.0 |
| Trineoheptyl trimesate | 30 | | 0.1 | 0.1 | 1.7 |
| Tri-p-cresyl trimesate | 120 | | 0.2 | 0.3 | 4.0 |

The following examples of benzoic acid esters are given to illustrate but in no way limit this invention.

*Example XXIX*

Dodecylphenyl benzoate was prepared by dissolving 524 parts by weight (2 moles) of dodecylphenol and 28.4 parts by weight of dimethylformamide catalyst in 454 parts by weight of benzene; slowly adding 309 parts by weight (2.2 moles) of benzoyl chloride to the solution at 70° C.; refluxing for 1 hour at 120° C.; cooling to room temperature; and adding 49 parts by weight of pyridine. The reaction product was washed with water, concentrated hydrochloric acid and 2% aqueous sodium hydroxide; stripped free of solvent and water; decolorized with charcoal; and filtered to give 585 parts by weight of product. The yield was 81% based upon the amount of dodecylphenol charged.

*Example XXX*

Octylphenyl benzoate was prepared by dissolving 312 parts by weight (1.5 moles) of octylphenol and 5 parts by weight of magnesium chloride in 454 parts by weight of toluene; adding 260 parts by weight (1.85 moles) of benzoyl chloride over a 1-hour period at 95° C.; cooling the reaction mixture to room temperature; adding 19.6 parts by weight of pyridine; and refluxing for 3 hours at 130° C. The reaction product was cooled; washed with 2% aqueous sodium hydroxide, concentrated hydrochloric acid and water; stripped to remove solvent; and decolorized to give 295 parts by weight of product. The yield was 95% based upon the amount of benzoyl chloride charged.

Table IV, below, sets forth physical properties of certain benzoic acid esters.

TABLE IV

| Ester | M.P. (° C.) | Pour Point, ° C. | Acid No. (MgKOH/gm.) | Percent OH | Viscosity at 450° F. (CS) |
|---|---|---|---|---|---|
| Dodecylphenyl benzoate | | -11 | 0.1 | 0.1 | 1.2 |
| Octylphenyl benzoate | 72.4-72.6 | | 0.1 | 0.1 | 0.98 |

Gas turbine engines are a most important source of power today. Turboprop and turbojet engines are in service with both the military and commercial aviation interests, and gas turbine engines are starting to become commercial power for boats and cars. As it is well known, a turbine consists of a shaft having blades or buckets spaced therearound. A high-temperature fluid under high pressure is directed against the blades or buckets, usually parallel to the axis of the shaft, and the energy of the fluid is transferred to the turbine thus causing the shaft to rotate and permitting it to do work. Gas turbines operate effectively at about 500 to 1000° F. with bearing temperature preferably about 525° F. to 600° F. Lubricants for such turbines are subjected, in use, to temperatures in this range.

Turbine engines are lubricated from central lubricant supply. The lubricant is fogged into the bearing chamber, in a so-called mist application, to lubricate the ball or roller bearings of the turbine. The lubricant also performs the important function of cooling the graphite seals between the turbine blades and the combustion chamber. After lubricating the roller or ball bearings, the lubricant is collected in sumps from which it is pumped back to the lubricant supply. The lubricant is degassed, before being recirculated, by centrifuging to remove any gas or volatiles (cracked lubricant molecules primarily) which have been introduced into the system. This same lubricant is also used to lubricate the drive gears for auxiliary power chains driven by the turbine. In the case of jet engines, these auxiliary drive chains can operate a compressor, air-conditioning units, guidance systems, weapons systems and the like. The lubricant is operable in the mesh of the auxiliary chain drive gears and therefore must withstand extremely high pressures.

It is also very important that the lubricant must be thermally and oxidatively stable in order to withstand the conditions encountered in turbine lubrication applications. Esters made in accord with this invention were tested to determine their thermal and oxidation stability. The thermal stability test was conducted by placing 25 grams of the ester under test in a tube with a nitrogen atmosphere, subjecting the tube and contents to high temperatures (650° F., and 750° F.) for 9 hours; and then testing the ester to determine its physical properties.

Table V, below, is a compilation of data taken from these tests.

TABLE V

| Ester | Acid No. | | | Wt. percent OH | | | Viscosity at 450° F. (CS) | | |
|---|---|---|---|---|---|---|---|---|---|
| | 650° F. | 700° F. | 750° F. | 650° F. | 700° F. | 750° F. | 650° F. | 700° F. | 750° F.)S |
| Diphenyl Diphenate | N.T. | 0.4 | 0.1 | N.T. | 0.1 | 0.4 | N.T. | 1.8 | 1.6 |
| Bis(o-chlorophenyl) diphenate | 10 | 1.3 | 1.1 | 1.8 | 1.3 | 1.4 | N.T. | 2.0 | 2.2 |
| Bis(p-phenylphenyl) diphenate | 0.5 | 0.1 | 0.1 | 0.1 | 0.3 | 2.3 | 4.9 | 4.1 | 3.0 |
| Phenyl p-phenylphenyl diphenate | 10.3 | 3.0 | 1.7 | 0.4 | 1.8 | 0.9 | 2.5 | 2.0 | 3.0 |
| Phenyl o-phenylphenyl diphenate | N.T. | N.T. | 0.1 | N.T. | N.T. | 2.8 | N.T. | N.T. | 2.0 |
| Tri-p-cresyl trimesate | 2.5 | 3.0 | 10 | 0.2 | 0.2 | 1.0 | 3.0 | 3.8 | 5.0 |
| Trixylenyl trimesate | 2.1 | 5.0 | 6.5 | 0.2 | 0.1 | 1.1 | 4.5 | 5.4 | 5.5 |
| Triphenyl trimesate | 0.3 | 0.3 | 2.4 | 0.1 | 0.1 | 0.3 | 3.3 | 3.2 | 4.0 |
| Dixylenyl terephthalate | 1.2 | 1.4 | 3.9 | 0.1 | 0.3 | 1.1 | 1.7 | 1.8 | 2.3 |
| Di-p-cresyl terephthalate | 1.1 | 5.0 | 7.1 | 0.0 | 0.2 | 0.3 | 1.5 | 1.6 | 2.0 |
| Dineopentyl terephthalate | 4.1 | 5.6 | 13 | 0.6 | 0.3 | 0.5 | 0.88 | 0.93 | 0.88 |
| Diphenyl terephthalate | 0.6 | 0.1 | 0.1 | 0.3 | 0.1 | 0.5 | 1.2 | 1.3 | N.T. |
| Dixylenyl isophthalate | 0.9 | 1.9 | 7.0 | 0.1 | 0.2 | 0.9 | 1.7 | 1.7 | 2.0 |
| Bis(o-chlorophenyl) isophthalate | 0.9 | 1.7 | 6.3 | 0.6 | 0.1 | 0.1 | 1.7 | 1.8 | 2.4 |
| Diphenyl isophthalate | 0.5 | 0.3 | 0.1 | 0.3 | 0.6 | 0.8 | 1.3 | 1.3 | 1.4 |
| Octylphenyl benzoate | 0.8 | 1.0 | 2.9 | 0.1 | 0.1 | 0.3 | 0.97 | 1.0 | 1.0 |
| Dodecylphenyl benzoate | 2.4 | 7.4 | 8.8 | 0.2 | 0.3 | 0.3 | 1.1 | 9.95 | N.T. |
| Dineopentyl diphenate | 3.3 | 3.0 | N.T. | 0.1 | 0.1 | N.T. | 1.0 | 0.99 | N.T. |
| Phenyl octylphenyl diphenate | 0.6 | N.T. | 0.3 | 0.4 | N.T. | 1.3 | 2.6 | N.T. | 2.4 |

N.T. = not tested

The oxidation stability test is conducted by placing 25 grams of the ester under test in a tube and subjecting it to a dry air flow of 1.2 liters per hour for 6 hours at various tempeartures (450° F.) after which time the esters were tested to determine their physical properties. Table VI, below, is a compilation of data taken from these tests.

TABLE VI

| Ester | Acid No. | Wt. percent OH | Viscosity at 450° F. (CS) |
|---|---|---|---|
| Diphenyl diphenate | 0.1 | 0.2 | 1.6 |
| Bis(o-chlorophenyl) diphenate | 0.3 | 0.3 | 2.6 |
| Bis(m-trifluoromethylphenyl) diphenate | 0.5 | 0.2 | 1.2 |
| Bis(p-phenylphenyl) diphenate | 2.0 | 0.2 | [1] 5.0 |
| Phenyl o-phenylphenyl diphenate | 1.3 | 0.3 | [1] 2.6 |
| Phenyl p-phenylphenyl diphenate | 4.0 | 0.1 | 2.1 |
| Phenyl octylphenyl diphenate | 8.2 | 0.5 | [1] 3.2 |
| Tri-p-cresyl trimesate | 30 | 0.3 | 8.2 |
| Trineopentyl trimesate | 44 | 0.8 | 1.8 |
| Trixylyl trimesate | 12 | 1.0 | 7.8 |
| Triphenyl trimesate | 0.6 | 0.1 | 3.2 |
| Dixylyl terephthalate | 11 | 0.8 | 2.3 |
| Di-p-cresyl terephthalate | 60 | 1.0 | 2.1 |
| Dixylyl isophthalate | 14 | 0.7 | 2.5 |
| Bis(o-phenylphenyl) isophthalate | 0.5 | 9.1 | [1] 2.7 |
| Bis(o-chlorophenyl) isophthalate | 0.5 | 0.2 | [1] 1.7 |
| Diphenyl isophthalate | 0.1 | 0.2 | [1] 1.2 |
| Octylphenyl benzoate | 0.2 | 0.1 | 0.99 |

[1] 500° F.

It is to be understood that the foregoing detailed description is given merely by way of illustration and that many variations may be made therein without departing from the spirit of our invention.

Having described our invention, what we desire to secure by Letters Patent is:

Bis(p-phenylphenyl) diphenate.

References Cited

UNITED STATES PATENTS

| | | | |
|---|---|---|---|
| 1,815,878 | 7/1931 | Van Schaak | 260—475 |
| 1,923,938 | 8/1933 | Kyrides | 260—475 |
| 1,949,093 | 2/1934 | Van Schaak | 260—475 |
| 1,993,738 | 3/1935 | Graves et al. | 260—475 |
| 2,047,664 | 7/1936 | Barrett et al. | 260—475 |
| 2,062,917 | 12/1936 | Lawson. | |
| 2,215,590 | 9/1940 | Maverick | 252—57 |
| 2,500,901 | 3/1950 | Monroe et al. | 260—476 |
| 2,786,076 | 3/1957 | O'Connor et al. | 260—523 |
| 2,873,292 | 2/1959 | Meyer | 260—475 |
| 2,910,453 | 10/1959 | Gordon | 260—476 |
| 2,937,996 | 5/1960 | Pethrick et al. | 252—57 |
| 3,010,991 | 11/1961 | Meyer | 260—475 |
| 3,048,608 | 8/1962 | Girard et al. | 260—475 X |
| 3,067,239 | 12/1962 | Mills | 260—475 |
| 3,076,837 | 2/1963 | Mills | 260—475 |

OTHER REFERENCES

Chemical Abstracts, vol. 49 (1955), 10925(b).

Heilbron, Dictionary of Organic Compounds, vol. 2 (1936), p. 446; vol. 3 (1938), p. 664.

Tables for Identification of Organic Compounds (Supplement to Handbook of Chemistry and Physics) (1960), pages 41 through 45.

LORRAINE A. WEINBERGER, *Primary Examiner.*

D. HORWITZ, D. McCUTCHEN, *Examiners.*

A. D. ROLLINS, R. E. MASSA, T. L. GALLOWAY,
*Assistant Examiners.*